United States Patent
Sugaya

(10) Patent No.: US 7,650,074 B2
(45) Date of Patent: Jan. 19, 2010

(54) OPTICAL TRANSMISSION APPARATUS

(75) Inventor: Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 350 days.

(21) Appl. No.: 11/319,362

(22) Filed: Dec. 29, 2005

(65) Prior Publication Data

US 2006/0222366 A1    Oct. 5, 2006

(30) Foreign Application Priority Data

Mar. 30, 2005    (JP) .............................. 2005-100137

(51) Int. Cl.
*H04J 14/02*    (2006.01)

(52) U.S. Cl. .............................. 398/79; 398/83; 398/85
(58) Field of Classification Search .................. 398/79, 398/82, 83, 85
See application file for complete search history.

(56) References Cited

U.S. PATENT DOCUMENTS

| | | | |
|---|---|---|---|
| 6,233,092 B1 | 5/2001 | Flood et al. | 359/345 |
| 6,639,716 B1 | 10/2003 | Tomofuji | 359/371.12 |
| 6,922,280 B1 | 7/2005 | Sugaya | 359/337 |
| 7,356,259 B1 * | 4/2008 | Haggans | 398/83 |
| 2006/0018658 A1 * | 1/2006 | Mori | 398/79 |

FOREIGN PATENT DOCUMENTS

| | | |
|---|---|---|
| JP | 2000-232433 | 8/2000 |
| JP | 2001-111495 | 4/2001 |
| JP | 2002-528901 | 9/2002 |

* cited by examiner

*Primary Examiner*—M. R. Sedighian
(74) *Attorney, Agent, or Firm*—Staas & Halsey LLP

(57) ABSTRACT

An optical transmission apparatus includes a demultiplexing unit that demultiplexes a light input to the optical transmission apparatus into a plurality of lights; an optical attenuator that adjusts an output level of a light within a band that includes a signal light from among demultiplexed lights; a bypass unit that bypasses a light outside the band from among demultiplexed lights; a multiplexing unit that multiplexes adjusted light and the light from the bypass unit; and an optical amplifier that amplifies input light. The optical amplifier is provided at least one of a stage prior to the demultiplexing unit and a stage subsequent to the multiplexing unit.

14 Claims, 12 Drawing Sheets

OPTICAL TRANSMISSION APPARATUS

CROSS-REFERENCE TO RELATED APPLICATIONS

This application is based upon and claims the benefit of priority from the prior Japanese Patent Application No. 2005-100137, filed on Mar. 30, 2005, the entire contents of which are incorporated herein by reference.

BACKGROUND OF THE INVENTION

1. Field of the Invention

The present invention relates to an optical transmission apparatus that transmits optical signals by wavelength-multiplexing the optical signals in an optical network.

2. Description of the Related Art

In a conventional backbone optical network (a metro core) that connects between cities, a wavelength division multiplexing (WDM) technique is used. In the WDM technique, optical signals are transmitted by multiplexing the wavelengths corresponding to the number of channels necessary for transmission paths, using an optical add and drop multiplexer (OADM) that is installed in each city.

FIG. 8 is a schematic of an OADM in a multi-stage connection in a backbone optical network. In a backbone optical network 9, plural N units (10a to 10n) of OADMs 10 are disposed on an optical transmission path (an optical fiber 140) to transmit optical signals. The backbone optical network 9 is, for example, a ring network. Each OADM 10 (10a to 10n) includes an optical amplifier 11 that amplifies a wavelength division multiplexed (WDM) light output from the optical fiber 140, a add/drop multiplexing unit 20 that adds and drops an optical signal for each channel of the WDM light, and an optical amplifier 12 that amplifies the added or dropped WDM light, and inputs the amplified WDM light to the optical fiber 140.

In the backbone optical network 9 shown in FIG. 8, the OADM 10a at a position A adds optical signals of five waves, the OADM 10b at a position B adds an optical signal of one wave, and the OADM 10n at a position N drops optical signals of five waves. Each OADM 10 on the backbone optical network 9 frequently adds and drops optical signals. In some cases, the optical fiber 140 at a position X between the position A and the position B is broken, and only one optical signal of one wave is transmitted to the optical fibers 140 at the position B and subsequent positions. Even when the number of operating wavelengths changes frequently, the backbone optical network 9 (the OADM 10 (10a to 10n)) needs to maintain communication quality for each optical signal.

To maintain communication quality, the optical amplifiers 11 and 12 in the OADM 10 control the gain of the input WDM light at a constant level. Specifically, regardless of the number of operating wavelengths of the WDM light, the output gain of each signal is set constant.

FIG. 9 is a schematic of the add/drop multiplexing unit. Assume that the WDM light is transmitted to a direction of an arrow A shown in FIG. 9. An add/drop multiplexing unit 20 includes a drop port 21, a demultiplexing filter 22, a variable optical attenuator (VOA) 23, a multiplexer 24, and an add port 25. FIG. 10 depicts an output of the WDM light. The horizontal axis represents a wavelength ($\lambda$), and the vertical axis represents power (Po) of each optical signal of the WDM light. As shown in FIG. 10, the WDM light is transmitted while optical signals of wavelengths $\lambda a$ to $\lambda n$ and an amplified spontaneous emission light (ASE) are accumulated as noise in the whole area.

When the WDM light as shown in FIG. 10 is input to the OADM 10, the optical amplifier 11 amplifies the WDM light, and outputs the amplified WDM light to the add/drop multiplexing unit 20. When the add/drop multiplexing unit 20 passes the whole optical signals without adding or dropping an optical signal, the demultiplexing filter 22 demultiplexes the signals into signals of wavelengths, and inputs the optical signals to the variable optical attenuator 23. In this case, light other than the optical signals of the wavelengths $\lambda a$ to $\lambda n$ is not demultiplexed. Therefore, the ASE other than those near the optical signals of the wavelengths $\lambda a$ to $\lambda n$ is removed. The variable optical attenuator 23 attenuates the optical signals of the input optical signals of the wavelengths $\lambda a$ to $\lambda n$, thereby correcting the signal waveform and adjusting the output level, and outputs the corrected result to the multiplexer 24. The multiplexer 24 multiplexes again the optical signals demultiplexed into those of different wavelengths, and outputs the multiplexed optical signals to the optical fiber 140.

FIG. 11 depicts the WDM light output from the add/drop multiplexing unit. The horizontal axis represents a wavelength ($\lambda$), and the vertical axis represents power (Po) of each optical signal of the WDM light. As shown in FIG. 11, the WDM light output from the add/drop multiplexing unit 20 includes the optical signals of the wavelengths $\lambda a$ to $\lambda n$, and the ASEs ($\lambda a\_ase$ to $\lambda n\_ase$). In this way, when viewed from a certain OADM 10, the output of each optical signal is set constant to maintain the communication quality (see, for example, Japanese Patent Application Laid-Open No. 2001-111495).

However, according to a conventional OADM, when the number of operating wavelengths changes while the OADMs are connected at multiple stages on the backbone optical network 9, a transitional delay occurs in the gain control immediately after this change, and the communication quality degrades during this transitional period.

FIG. 12 is a schematic for illustrating a change in the number of operating wavelengths of the WDM light input to the optical amplifier. The horizontal axis represents a wavelength ($\lambda$), and the vertical axis represents power (Po) of each optical signal of the WDM light. FIG. 12 depicts the change of states from a time 1201 to a time 1202 after a lapse of a time t. It is explained below that optical signals of six operating wavelengths $\lambda a$ to $\lambda f$ of the WDM signals input to the optical amplifier 11 or the optical amplifier 12 at the time 1201 change to an optical signal of only one wave $\lambda f$ at the time 1202.

FIG. 13 depicts a change in the wavelength when optical signals having six waves change to an optical signal having one wave in the conventional OADM. The horizontal axis represents a wavelength ($\lambda$), and the vertical axis represents power (Po) of each optical signal of the WDM light. FIG. 13 depicts the change of states from a time 1301 to a time 1302 after a lapse of a time t.

Assume that the WDM light including the optical signals having six operating wavelengths $\lambda a$ to $\lambda f$ at the time 1201 as shown in FIG. 12 is input to the OADM 10. When the optical signals pass through the demultiplexing filter 22, the ASE other than the optical signals is removed as described above. Therefore, the WDM light including the optical signals having the six wavelengths $\lambda a$ to $\lambda f$, and the ASEs ($\lambda a\_ase$ to $\lambda f\_ase$) is output at the time 1301.

On other hand, assume that the number of the operating wavelengths of the WDM light is changed to one, and the WDM light including the optical signal of only one wave as shown at the time 1202 in FIG. 12 is input to the OADM 10. When the optical signal passes through the demultiplexing filter 22, the WDM light at the time 1302 as shown in FIG. 13 is output. At the time 1302, the WDM light includes the optical signal having the wavelength λf, and the ASE (λa_ase to λf_ase). This WDM light with these wavelengths is input to the optical amplifier 12. In this case, the optical amplifier 12 detects the power of the whole wavelengths of the optical signals to control the gain. In other words, the optical amplifier 12 controls the gain so that the gain becomes constant based on the power of the ASE (λa_ase to λf_ase) in the state of the optical signals of the six waves immediately before the number of the operating wavelengths transitionally changes, immediately after the number of the wavelengths of the optical signals becomes one.

FIG. 14 is a schematic for illustrating the output of the optical amplifier in the change of the operating wavelengths shown in FIG. 12. The horizontal axis represents a wavelength (λ), and the vertical axis represents power (Po) of each optical signal of the WDM light. FIG. 14 depicts the change of states from a time 1401 to a time 1402 after a lapse of a time t. Assume that in the state shown in FIG. 13, the optical signal of one wave λf has predetermined power among the six waves λa to λf having the power as shown at the time 1401 in FIG. 14.

Assume that thereafter, the number of operating wavelengths changes, and the five waves λa to λe are excluded, and only one wave λf is available. During a transitional response period, immediately after the number of the operating wavelengths changes, the optical amplifier 11 (12) decreases the intrinsic power of the one wave λf by a portion indicated by an arrow D to the power shown at the time 1402. The optical amplifier 11 (12) controls the gain in the form of averaging the whole wavelengths λa to λf at the time 1041. Therefore, the optical amplifier 11 (12) controls the gain such that the power of the one wave λf at the time 1402 is affected by the power level of the five waves λa to λe at the time 1401 when the power levels are substantially arranged.

From the viewpoint of one OADM 10, such power, in other words, the gain variation, can be disregarded as a minor gain variation. However, if the OADMs 10 are connected in multiple stages as the OADMs 10a to 10n in the actual backbone optical network 9 as shown in FIG. 8, as optical signals are dropped from and added to the OADMs 10 toward the latter stages on the transmission path, this gain variation is gradually accumulated. When the accumulated gain variation becomes too large, the gain of optical signals becomes smaller than that of the reception ranges, and the optical signals cannot be recognized. As a result, a reception error occurs, and communication quality is degraded.

The OADM disclosed in Japanese Patent Application Laid-Open No. 2001-111495 has a function of preventing reduction in the gain level. However, the function requires an additional light source to be provided in the OADM. This increases both cost and size.

SUMMARY OF THE INVENTION

It is an object of the present invention to at least solve the problems in the conventional technology.

An optical transmission apparatus according to one aspect of the present invention includes a branching unit configured to branch a light input to the optical transmission apparatus into a plurality of lights; an optical attenuator configured to adjust an output level of a light within a band that includes a signal light from among branched lights; a bypass unit configured to bypass a light outside the band from among branched lights; a multiplexing unit configured to multiplex adjusted light and the light from the bypass unit; and an optical amplifier configured to amplify input light. The optical amplifier is provided at least one of a stage prior to the branching unit and a stage subsequent to the multiplexing unit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail below with reference to the accompanying drawings.

Figure 1:
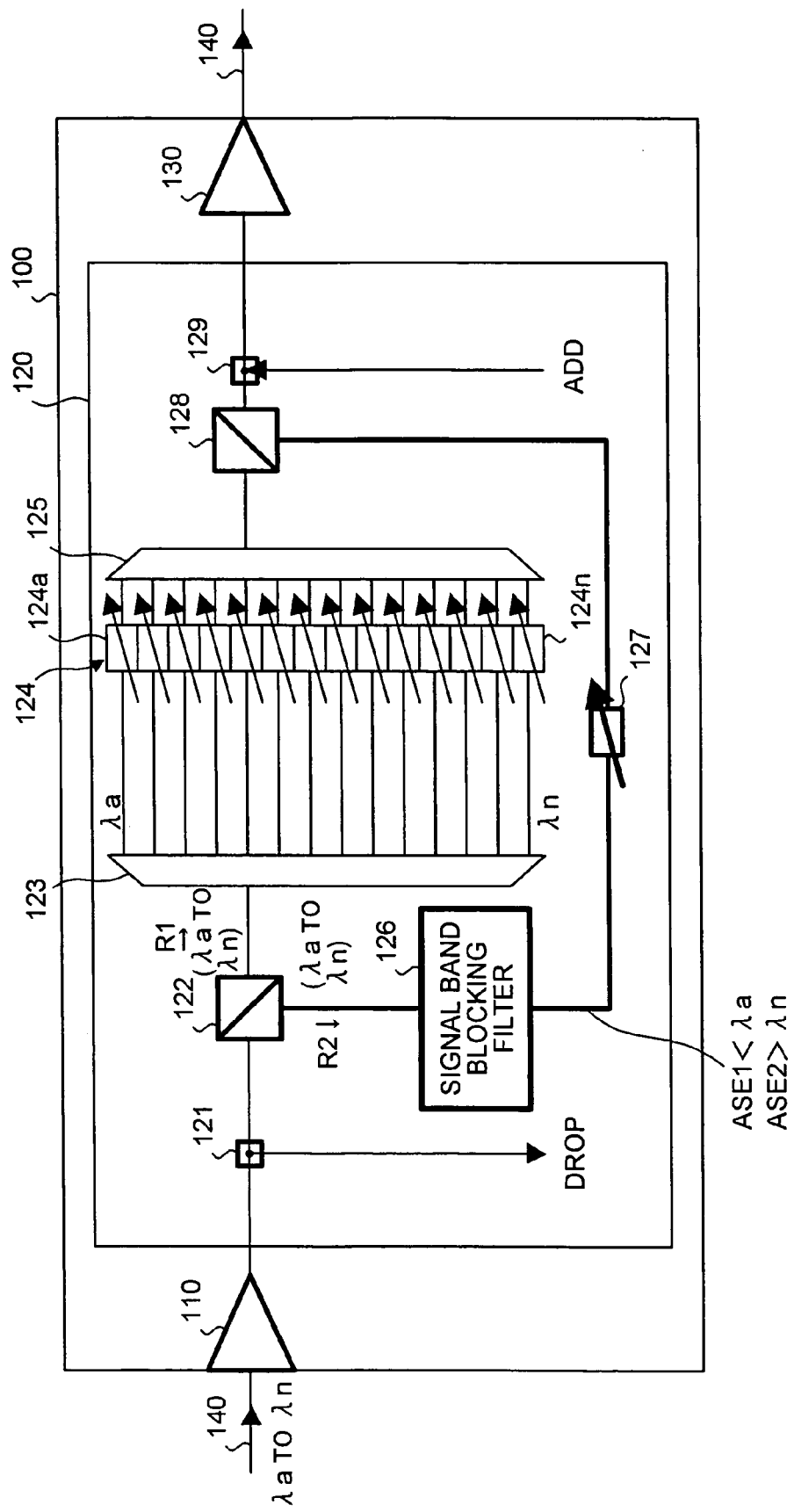
FIG. 1 is a schematic of an OADM according to embodiments of the present invention.

FIG. 1 is a schematic of an OADM according to embodiments of the present invention. Plural units of OADMs 100 shown in FIG. 1 are disposed in the backbone optical network 9, and are used to transmit WDM signals. Each OADM 100 includes optical amplifiers 110 and 130 and an optical add/drop multiplexing unit 120, and is connected to the optical fiber 140.

The optical add/drop multiplexing unit 120 includes a drop port 121, a optical coupler (a 1×2 optical coupler) 122 as a branching unit that branches an input light, a demultiplexing filter 123, a variable optical attenuator (VOA) 124 as an optical attenuator that adjusts an optical output level of a band including optical signals, a multiplexer 125, a signal-band blocking filter 126, a variable optical attenuator (VOA) 127, a optical coupler (a 2×1 optical coupler) 128 as a multiplexing unit, and an add port 129.

The 1×2 optical coupler 122 demultiplexes an input optical signal into two, outputs one of the demultiplexed optical signals to the demultiplexing filter 123, and outputs the other optical signal to the signal-band blocking filter 126. A route R1 is an optical route for a light in a band including the optical signal (the signal light). The other route R2 functions as a bypass unit that bypasses light outside the band including the optical signal.

A WDM light including multiplexed optical signals of different wavelengths λa to λn in a specific band is transmitted through the optical fiber 140. First, the WDM light is output from the optical fiber 140 to the OADM 100. The WDM light that is input to the OADM 100 is first input to the optical amplifier 110. The optical amplifier 110 amplifies the input WDM light, and outputs the amplified WDM light to the optical add/drop multiplexing unit 120. The optical amplifier 110 is set to amplify the band of the input WDM light, that is, the light having a wider band than the waveband (λa to λn) of the optical signals. Therefore, the optical amplifier 110 also amplifies the ASE included in the wavelength shorter than and the wavelength longer than the waveband of the optical signals respectively.

Figure 2:
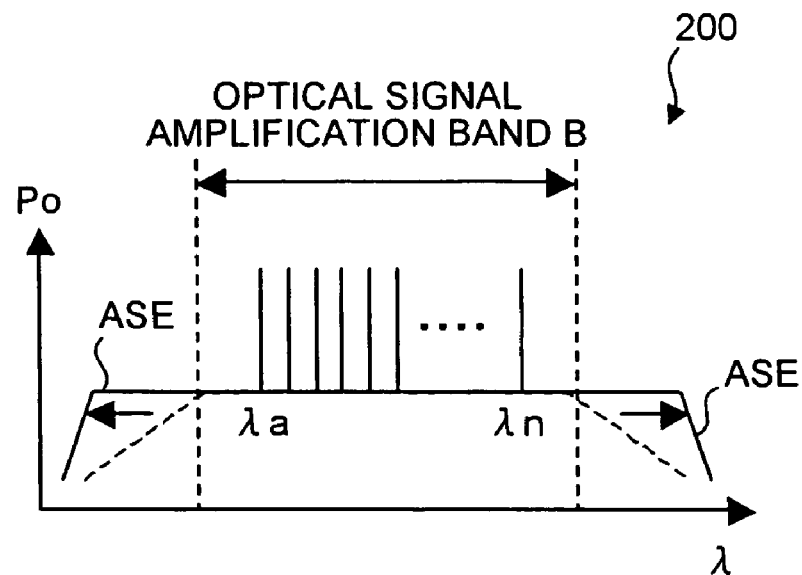
FIG. 2 depicts an amplification band of a WDM signal amplified by an optical amplifier.

FIG. 2 depicts an amplification band of the WDM signal amplified by the optical amplifier. In a diagram 200 shown in FIG. 2, the horizontal axis represents a wavelength (λ), and the vertical axis represents power (Po) of each optical signal of the WDM light. A general optical amplifier amplifies only an optical signal amplification band B shown in the diagram 200. On the other hand, the optical amplifier 110 according to the present invention shown in FIG. 1 amplifies a wide band indicated by a solid line of the input ASE in addition to the optical signal amplification band B indicated by a dotted line. This optical amplifier 110 can be obtained by changing a transmission factor (a wavelength characteristic) of a filter incorporated in the optical amplifier.

With reference to FIG. 1 again, the WDM light output to the optical add/drop multiplexing unit 120 is input to the 1×2 optical coupler 122 via the drop port 121. The optical signal to be dropped from among the optical signals multiplexed into the WDM light is dropped from the drop port 121. The 1×2 optical coupler 122 demultiplexes the input WDM light into two, outputs one demultiplexed light to the demultiplexing filter 123, and outputs the other demultiplexed light to the signal-band blocking filter 126. The 1×2 optical coupler 122 demultiplexes the multiplexed optical signals regardless of the wavelengths included in the WDM light.

The demultiplexing filter 123 demultiplexes the input WDM light into optical signals of the wavelengths λa to λn, and outputs the optical signals to the corresponding variable optical attenuator 124. The variable optical attenuator 124 has plural variable optical attenuators 124a to 124n corresponding to the demultiplexed wavelengths. Each variable optical attenuator adjusts the level of the input optical signal, and outputs the adjusted optical signal to the multiplexer 125. The multiplexer 125 multiplexes the optical signals input from the variable optical attenuator 124 for each optical signal, into the WDM light again, and outputs the WDM light to the 2×1 optical coupler 128.

On the other hand, the signal-band blocking filter 126 blocks only the light of the wavelengths λa to λn in the optical signal amplification band B out of the WDM light that is output to the signal-band blocking filter 126 from the 1×2 optical coupler 122. As a result, the signal-band blocking filter 126 passes the ASE (ASE1 and ASE2) having wavelengths shorter than λa and longer than λn that are other than the wavelengths λa to λn in the optical signal amplification band B, and outputs the ASE1 and the ASE2 to the variable optical attenuator 127. The variable optical attenuator 127 adjusts the level of the input ASE, and outputs the adjusted ASE to the 2×1 optical coupler 128. The OADM 100 can be configured without providing the variable optical attenuator 127.

Regarding the setting of the attenuation in the variable optical attenuator 127, when the transmission factor of the ASE to be passed is set high and the ASE is output at a high level, the ASE oscillates in the transmission path and this affects the optical signals. Therefore, an upper limit is set to the transmission factor of the ASE in the variable optical attenuator 127.

Figure 3:
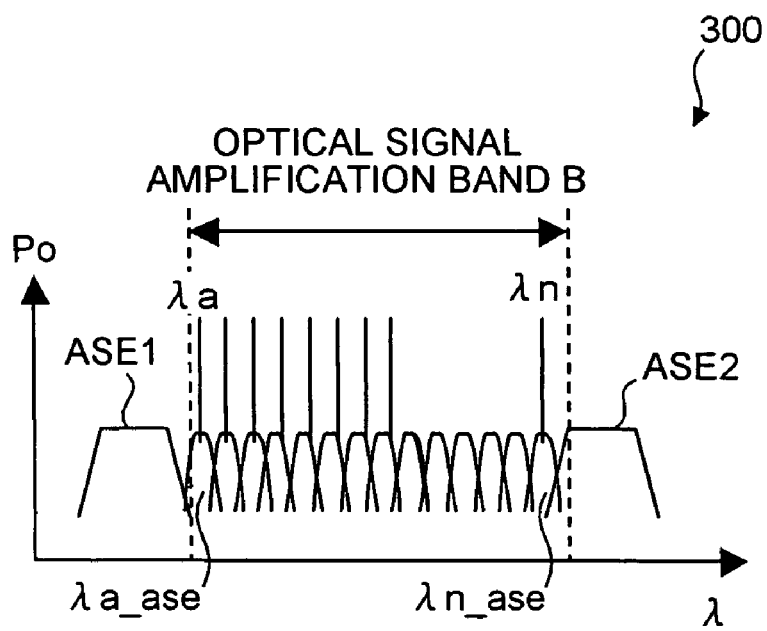
FIG. 3 depicts optical signals and ASEs that are multiplexed by a 2×1 optical coupler.

FIG. 3 depicts the optical signals and the ASE that are multiplexed by the 2×1 optical coupler 128. In a diagram 300 shown in FIG. 3, the horizontal axis represents a wavelength, and the vertical axis represents power of each optical signal of the WDM light. As explained with reference to FIG. 1, the 2×1 optical coupler 128 multiplexes the WDM light having the wavelengths λa to λn output from the multiplexer 125 with the ASE (ASE1 and ASE2) demultiplexed and output from the variable optical attenuator 127. As shown in the diagram 300, the multiplexed WDM light includes the optical signals having the wavelengths λa to λn in the optical signal amplification band B, and the ASE (ASE1 and ASE2) in the band the outside the optical signal amplification band B. As described above, the optical signals having the wavelengths λa to λn include the ASE (λa_ase to λn_ase).

The WDM light obtained by multiplexing with the 2×1 optical coupler 128 is output to the optical amplifier 130 via the add port 129. When an additional optical signal is added, this optical signal is added from the add port 129. For the optical amplifier 130 to amplify the optical signals having the wavelengths λa to λn included in the WDM signal, and the ASE (the ASE1 and the ASE2), similarly to the optical amplifier 110, a larger amplification band is set to the optical amplifier 130 than the amplification band set to the general optical amplifier. The amplified WDM light is output to the optical fiber 140. While the optical amplifier 110 is disposed at a stage before the optical coupler 122 and the optical amplifier 130 is disposed at a stage after the optical coupler 128, only one of these optical amplifiers can be provided.

Figure 4:
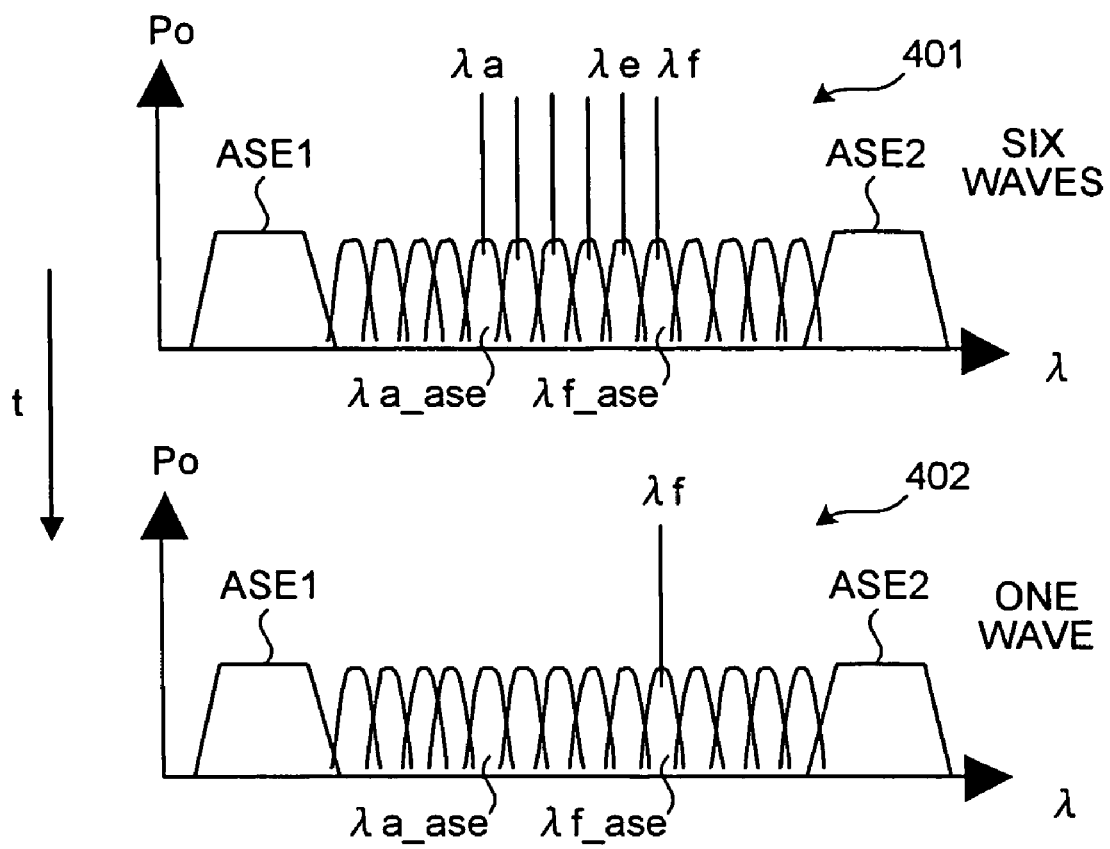
FIG. 4 depicts a change in wavelengths when an optical signal of six waves is changed to an optical signal of one wave in the OADM according to the present invention.

FIG. 4 depicts a change in the wavelengths when an optical signal of six waves is changed to an optical signal of one wave in the OADM according to the present invention. The horizontal axis represents a wavelength, and the vertical axis represents power of each optical signal. At a time 401, the OADM 100 has an optical signal having six operating wavelengths λa to λf. At time 402 after a lapse of time t since the time 401, the optical signals change to an optical signal having only one operating wavelength λf.

As shown in FIG. 4, the ASE1 and the ASE2 remain in the WDM light as background respectively. Assume that the number of operating wavelengths changes due to a drop by the OADM 100 or breakage of the optical fiber 140. As shown in FIG. 4, assume that the optical signal having six operating wavelengths λa to λf at the time 401 changes to the optical signal having only one operating wavelength λf by decreasing five operating wavelengths λa to λe at the time 402. Even in this case, the optical amplifiers 110 and 130 carry out the output control by matching the power of the optical signal having one operating wavelength λf, based on the ASE (the ASE1 and the ASE2, λa_ase to λn_ase) as the background. Particularly, the power of the ASE does not change even after the number of the operating wavelengths changes. Therefore, variation in the gain can be suppressed.

Figure 5:
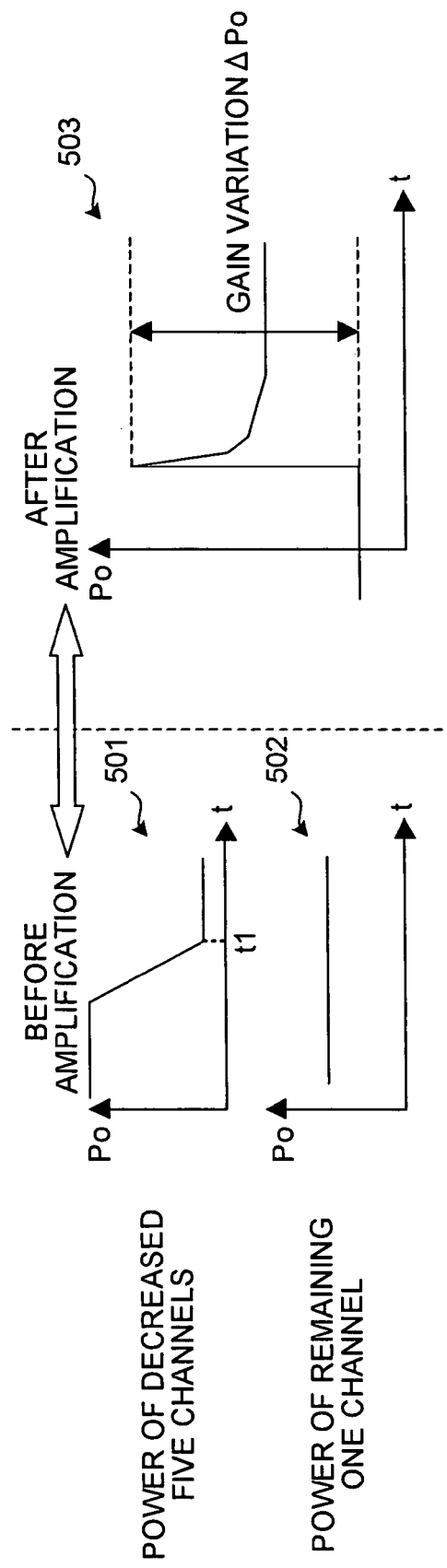
FIG. 5 depicts gain variation following a change in the number of operating wavelengths in a conventional OADM.
Figure 6:
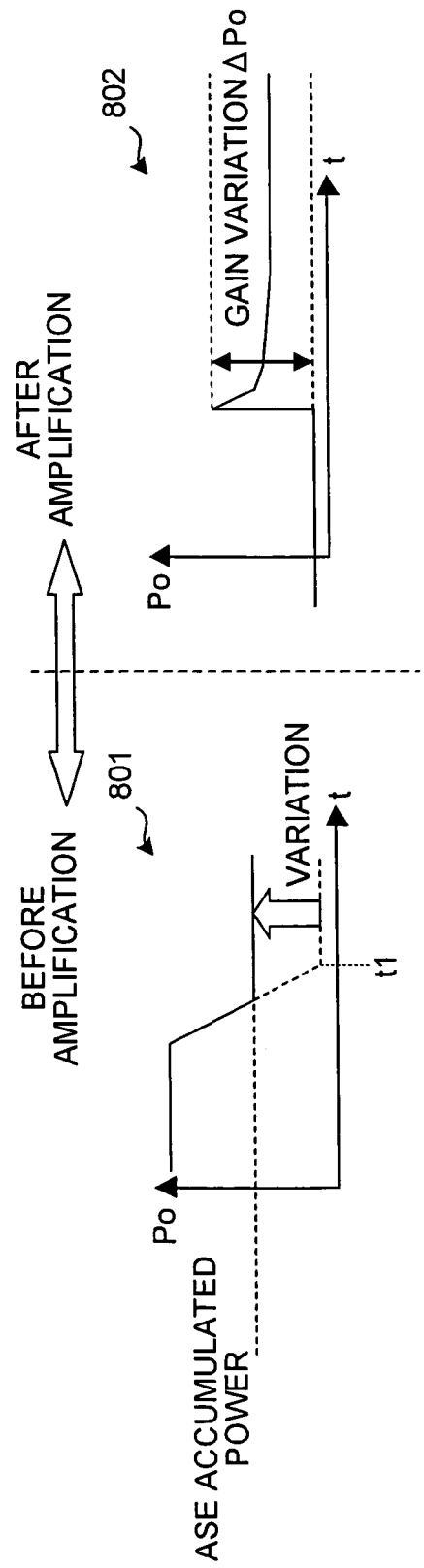
FIG. 6 depicts gain variation following a change in the number of operating wavelengths in an OADM according to embodiments of the present invention.

FIG. 5 depicts gain variation following a change in the number of operating wavelengths in the conventional OADM. FIG. 6 depicts gain variation following a change in the number of operating wavelengths in the OADM according to the present invention. In FIG. 5 and FIG. 6, the horizontal axis represents lapse of time (t), and the vertical axis represents power (Po) of the WDM light.

Figure 8:
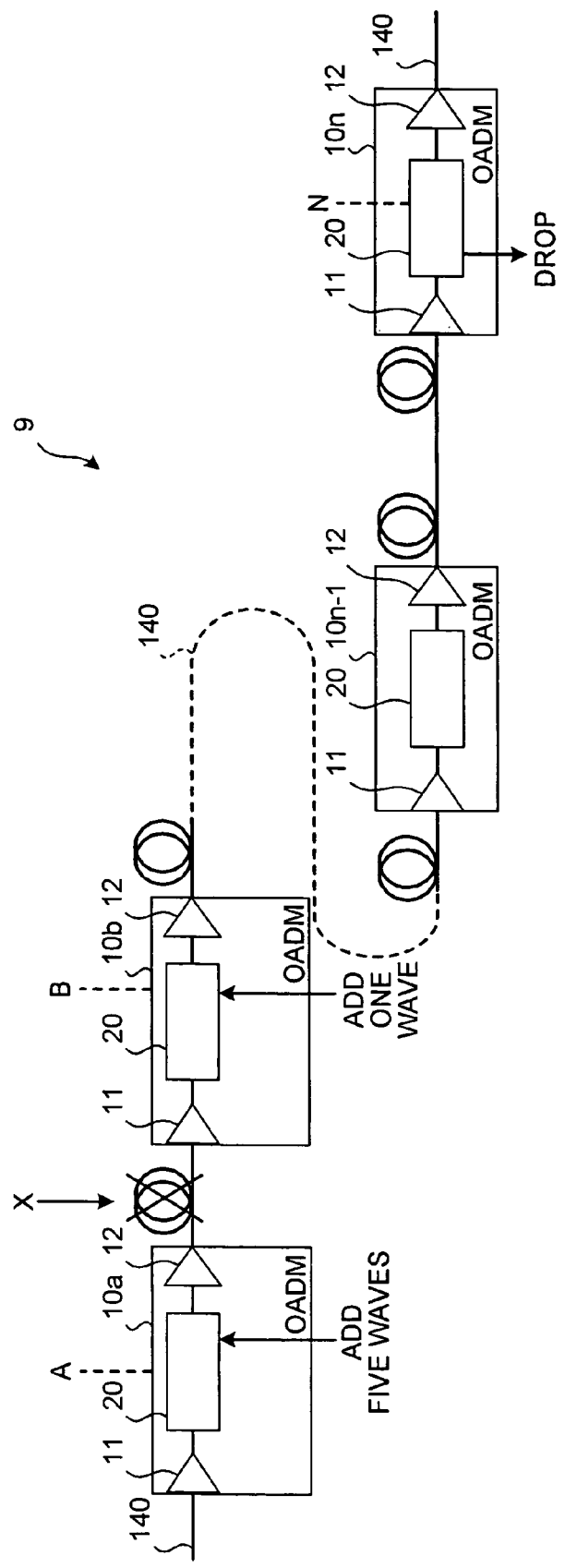
FIG. 8 is a schematic of an OADM in a multi-stage connection in a backbone optical network.
Figure 9:
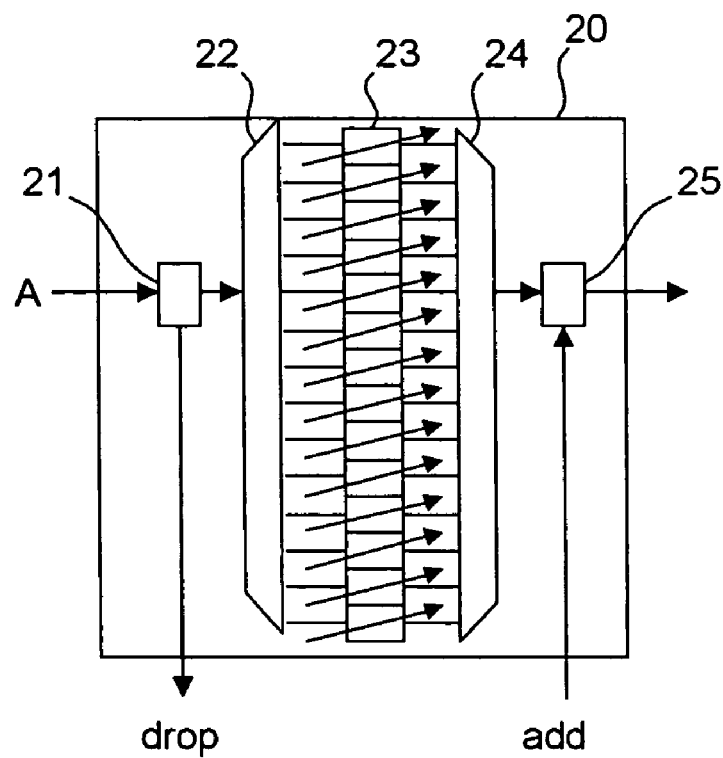
FIG. 9 is a schematic of an add/drop multiplexing unit.
Figure 10:
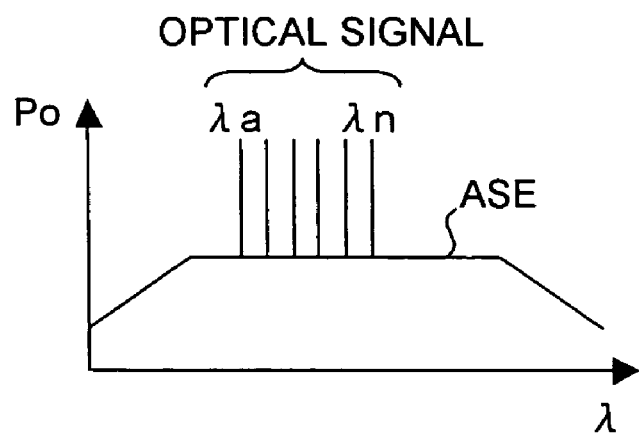
FIG. 10 depicts an output of a WDM light.
Figure 11:
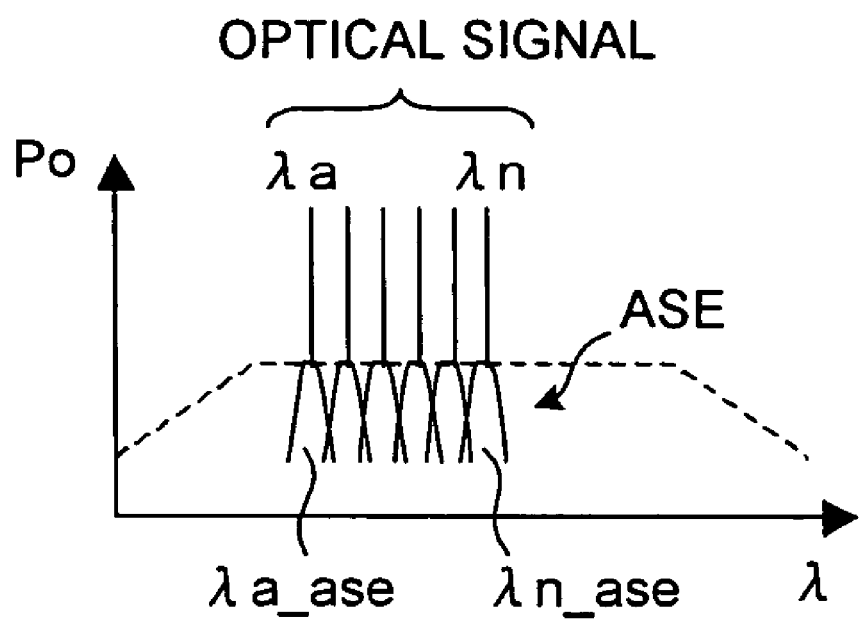
FIG. 11 depicts the WDM light output from the add/drop multiplexing unit.
Figure 12:
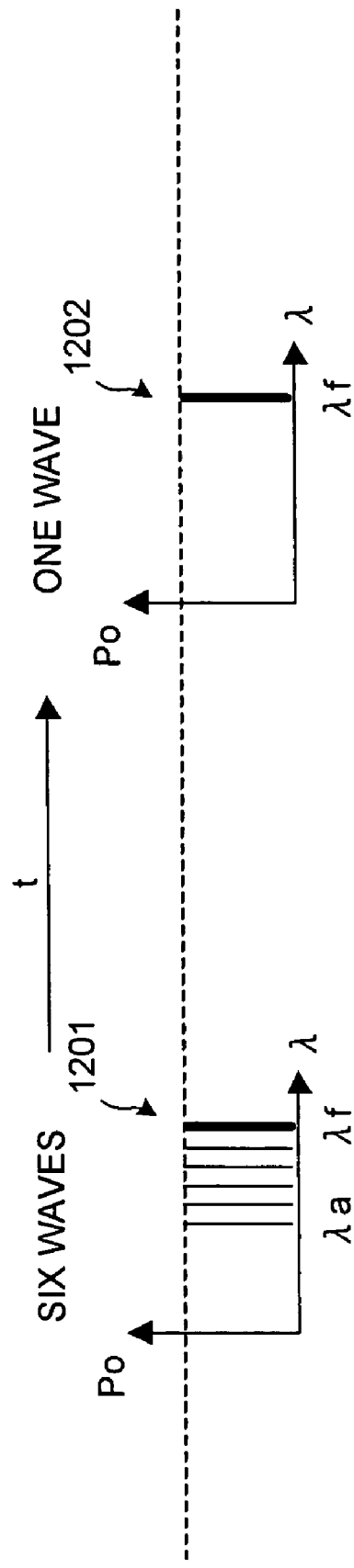
FIG. 12 is a schematic for illustrating a change in the number of operating wavelengths of the WDM light input to the optical amplifier.
Figure 13:
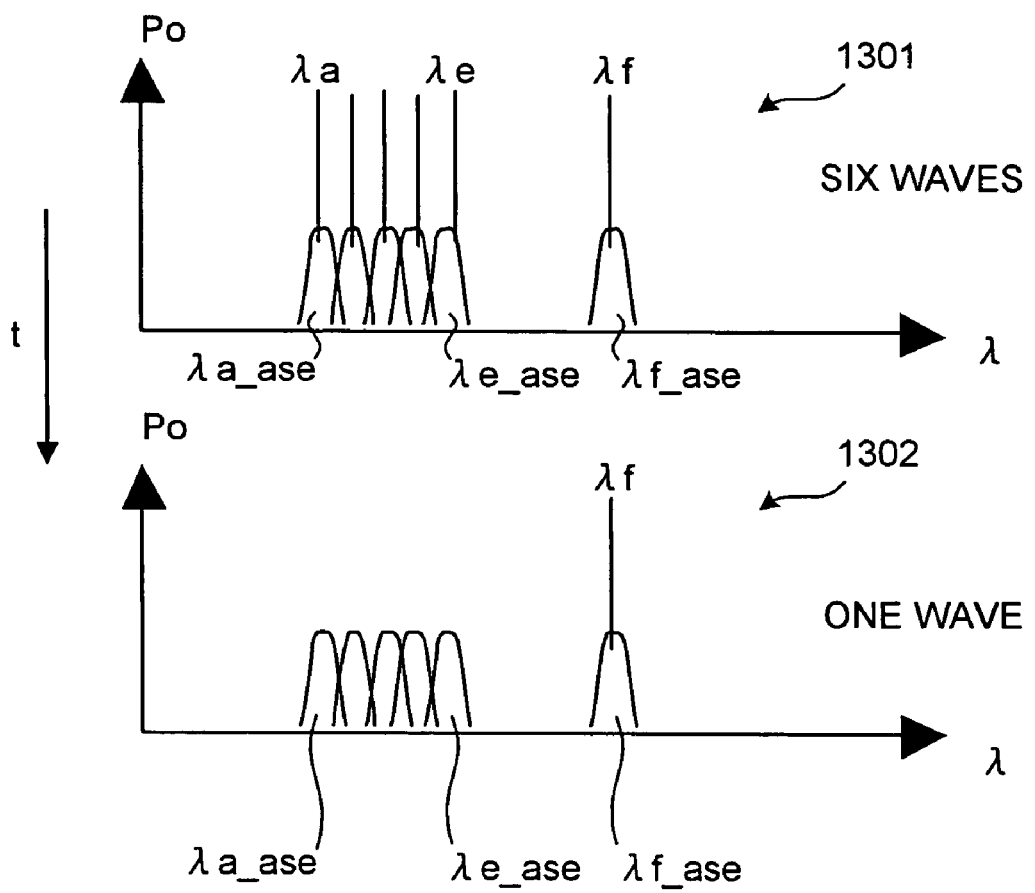
FIG. 13 depicts a change in the wavelength when optical signals having six waves change to an optical signal having one wave in the conventional OADM.
Figure 14:
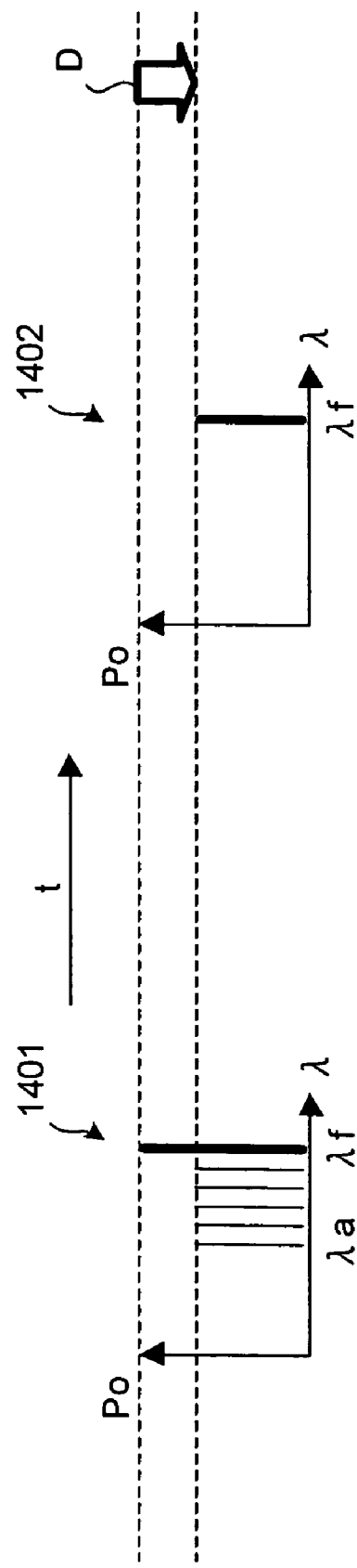
FIG. 14 is a schematic for illustrating the output of the optical amplifier in the change of the operating wavelengths shown in FIG. 12.

With reference to FIG. 5 depicting the power of the WDM light in the conventional OADM (for example, the OADM 10 shown in FIG. 8), before the optical amplifier 12 amplifies the optical signals (or the optical amplifier 11, when the reduction of the number of wavelengths is due to dropping or due to breakage of the optical fiber 140), power 501 of the WDM light in the optical amplifier 12 shows a change in the power of the decreased five waves (equivalent to channels: for example, the wavelengths λa to λe in FIG. 12). The power of the five waves (channels) decreases to the power of the ASE (λa_ase to λe_ase) after the time t1 (at the reduction time). On the other hand, power 502 is the power of the remaining one wave (channel: the wavelength λf in FIG. 12), and constant power is maintained. Therefore, as shown in a characteristic line 503, a gain variation ΔPo after the amplification carried out by the optical amplifier 12 is large.

On the other hand, with reference to FIG. 6 depicting the power of the WDM light in the OADM 100 according to the present invention, power 801 shows a change in the power of the decreased five waves (channels: for example, the wavelengths λa to λe in FIG. 4) and the ASE accumulated power. After the power decreases at the time t1 (at the reduction time), a difference with respect to the ASE accumulated power becomes a variation. Therefore, as shown in a characteristic line 802, after the optical amplifier 120 amplifies the optical signals (or the optical amplifier 110, when the reduction of the number of wavelengths is due to dropping or due to breakage of the optical fiber 140), the gain variation ΔPo can be decreased from that shown in the characteristic line 503 in FIG. 5.

Figure 7:
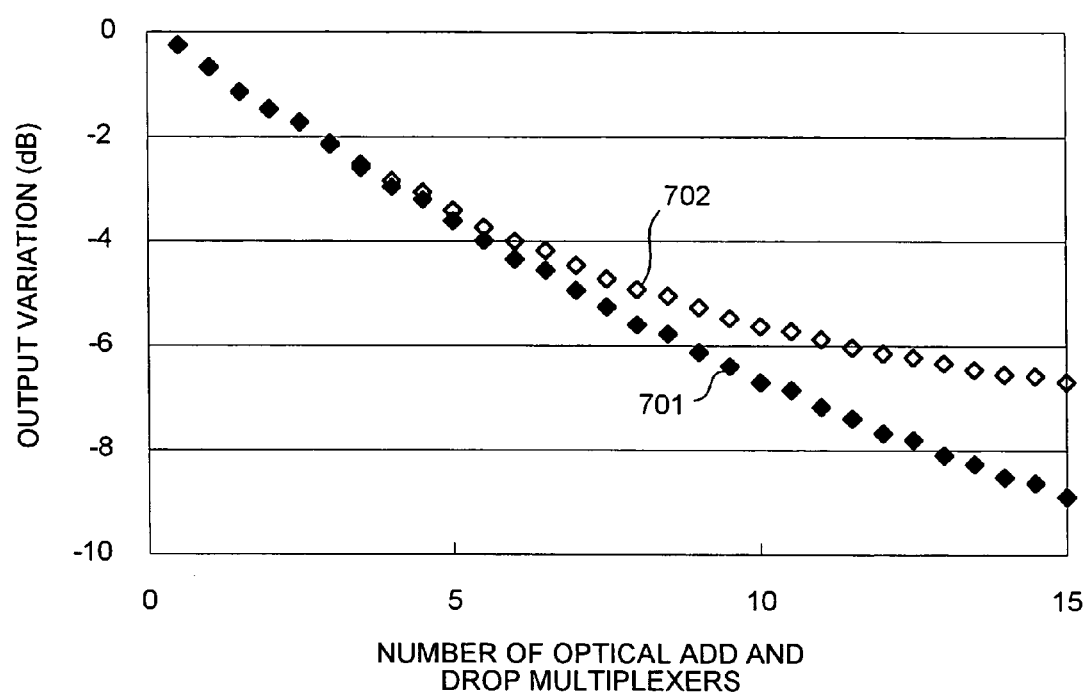
FIG. 7 is a graph of an output variation when OADMs are connected in multiple stages.

FIG. 7 is a graph of an output variation when OADMs are connected at multiple stages. In FIG. 7, the horizontal axis represents the number of OADMs connected at multiple stages in the backbone optical network, and the vertical axis represents a variation in the output (decibel) when the number of operating wavelengths of the WDM light in the OADMs changes from five waves to one wave. Values of plotted black squares show a characteristic line 701 according to the conventional OADMs 10 (see FIG. 8), and values of plotted white squares show a characteristic line 702 according to the OADMs 100 (see FIG. 1) of the present invention.

As is clear from the characteristic line 702 shown in FIG. 7, the OADM 100 according to the present invention can also pass the ASE (the ASE1 and the ASE2, see FIG. 4) other than the band of the optical signals. Therefore, when the number of the operating wavelengths of the WDM light changes, the OADM 100 can decrease the variation in the power of the optical signals. When the number of connected OADMs 100 is small, the variation in the output is small. Therefore, the OADM according to the present invention and the conventional OADM 10 show little difference in the output variation. However, when the number of the OADMs 100 increases, the output variation increases. As a result, when 15 OADMs 100 are connected, the gain variation can be improved by 2.6 decibels, as compared with the conventional OADMs 10.

The OADM 100 according to the present invention does not require an additional light source for reducing the gain variation, and uses the ASE as the light source using optical couplers (the 1×2 optical coupler 122, and the 2×1 optical coupler 128 shown in FIG. 1) and a filter (the signal-band blocking filter 126). Therefore, cost can be suppressed. Furthermore, the size of the OADM 100 remains unchanged from the size of the OADM having the conventional function.

As explained above, the OADM 100 according to the present invention can substantially decrease the transitional gain variation when the number of operating wavelengths changes, compared to the conventional OADM. Consequently, even when the OADMs 100 are connected in multiple stages in the backbone optical network connecting between cities, the communication quality can be maintained.

According to the embodiments described above, even when the number of operating wavelengths changes, a degree of gain variation due to accumulation of an amount of gain variation can be suppressed, thereby maintaining communication quality of optical signals.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus receiving a light including a wavelength division multiplexed (WDM) light in which a plurality of optical signals at different wavelengths in a waveband are multiplexed together, the apparatus comprising:
   a demultiplexer configured to demultiplex the WDM light in the light received by the apparatus into the plurality of optical signals;
   an optical attenuator configured to adjust a level of a respective demultiplexed optical signal;
   a multiplexer configured to multiplex together the demultiplexed plurality of optical signals after the optical attenuator attenuates the level of said respective demultiplexed optical signal, to thereby provide an adjusted, WDM light;
   a bypass unit configured to route amplified spontaneous emission (ASE) light in the light received by the apparatus and which is outside of the waveband so that the routed ASE does not pass through the demultiplexer and the multiplexer;
   a coupler configured to multiplex together the adjusted, WDM light provided by the multiplexer and the ASE light routed by the bypass unit; and
   an optical amplifier having an amplification band that includes the waveband and the routed ASE light, and is provided at at least one of a stage prior to the demultiplexer so that the optical amplifier amplifies the WDM light and the ASE light in the light received by the apparatus, and a stage subsequent to the coupler so that the optical amplifier amplifies adjusted, WDM light and the ASE light multiplexed together by the coupler.

2. The apparatus according to claim 1, wherein the bypass unit includes a signal-band blocking filter configured to block light within the waveband so that light within the waveband is not routed by the bypass unit and then multiplexed by the coupler with the adjusted, WDM light.

3. The apparatus according to claim 1, wherein
   the bypass unit includes a transmission-factor changing unit configured to change a transmission factor of the routed ASE light.

4. The apparatus according to claim 3, wherein
   the transmission-factor changing unit is configured to set an upper limit for the transmission factor.

5. The apparatus according to claim 1, further comprising
   a drop port configured to drop an optical signal from the WDM light, wherein the drop port is positioned at a stage prior to a position at which the bypass unit routes ASE from the light received by the apparatus.

6. A method comprising:
receiving a light including a wavelength division multiplexed (WDM) light in which a plurality of optical signals at different wavelengths in a waveband are multiplexed together;
demultiplexing the WDM light in the received light into the plurality of optical signals;
adjusting a level of a respective demultiplexed optical signal;
first multiplexing together the demultiplexed plurality of optical signals after said adjusting, to thereby provide an adjusted, WDM light;
routing amplified spontaneous emission (ASE) light in the received light and which is outside of the waveband so that the routed ASE does not pass through said demultiplexing and said first multiplexing;
second multiplexing together the adjusted, WDM light provided by said first multiplexing and the ASE light routed by said routing; and
amplifying with an amplification band that includes the waveband and the routed ASE light, said amplifying being performed at least one of a stage prior to said demultiplexing so that said amplifying amplifies the WDM light and the ASE light in the received light, and a stage subsequent to said second multiplexing so that said amplifying amplifies the adjusted, WDM light and the ASE light multiplexed together by said second multiplexing.

7. The method according to claim 6, wherein said routing includes blocking light within the waveband so that light within the waveband is not routed by said routing and then multiplexed by said second multiplexing with the adjusted, WDM light.

8. The method according to claim 6, wherein said routing includes changing a transmission factor of the routed ASE light.

9. The method according to claim 8, wherein an upper limit is set for the transmission factor.

10. The method according to claim 6, further comprising dropping an optical signal from the WDM light at a stage prior to a position at which said routing routes ASE light from the received light.

11. An apparatus receiving a light including a wavelength division multiplexed (WDM) light in which a plurality of optical signals at different wavelengths in a waveband are multiplexed together, the apparatus comprising:
a demultiplexer configured to demultiplex the WDM light in the light received by the apparatus into the plurality of optical signals;
a plurality of optical attenuators configured to adjust levels of the demultiplexed plurality of optical signal, respectively, to thereby provide level adjusted optical signals;
a multiplexer configured to multiplex together the level adjusted optical signals, to thereby provide an adjusted, WDM light;
a bypass unit configured to route amplified spontaneous emission (ASE) light in the light received by the apparatus and which is outside of the waveband so that the routed ASE does not pass through the demultiplexer and the multiplexer;
a coupler configured to multiplex together the adjusted, WDM light provided by the multiplexer and the ASE light routed by the bypass unit;
a first optical amplifier having an amplification band that includes the waveband and the routed ASE light, and provided at a stage prior to the demultiplexer so that the first optical amplifier amplifies the WDM light and the ASE light in the light received by the apparatus;
a second optical amplifier having an amplification band that includes the waveband and the routed ASE light, and provided at a stage subsequent to the coupler so that the second optical amplifier amplifies adjusted, WDM light and the ASE light multiplexed together by the coupler;
a drop port positioned between the first and second optical amplifiers to drop optical signals from the WDM light in the light received by the apparatus;
an add port positioned between the first and second optical amplifiers to add optical signals to the WDM light in the light received by the apparatus.

12. The apparatus according to claim 11, wherein the bypass unit includes a transmission-factor changing unit configured to change a transmission factor of the routed ASE light.

13. The apparatus according to claim 12, wherein the transmission-factor changing unit is configured to set an upper limit for the transmission factor.

14. An apparatus receiving a light including a wavelength division multiplexed (WDM) light in which a plurality of optical signals at different wavelengths in a first waveband are multiplexed together, the apparatus comprising:
a demultiplexer to demultiplex the WDM light in the light received by the apparatus into the plurality of optical signals, to thereby output a demultiplexed plurality of optical signals;
a multiplexer to multiplex together the demultiplexed plurality of optical signals, to thereby provide a WDM light;
a bypass unit to route amplified spontaneous emission (ASE) light in the light received by the apparatus and which is outside of the first waveband so that the routed ASE does not pass through the demultiplexer and the multiplexer;
a coupler configured to multiplex together the WDM light provided by the multiplexer and the ASE light routed by the bypass unit; and
an optical amplifier having an amplification waveband that includes the first waveband and the routed ASE light, and provided at least one of
a stage prior to the demultiplexer so that the optical amplifier amplifies the WDM light and the ASE light in the light received by the apparatus, and
a stage subsequent to the coupler so that the optical amplifier amplifies the WDM light and the ASE light multiplexed together by the coupler.

* * * * *

UNITED STATES PATENT AND TRADEMARK OFFICE
CERTIFICATE OF CORRECTION

PATENT NO. : 7,650,074 B2
APPLICATION NO. : 11/319362
DATED : January 19, 2010
INVENTOR(S) : Yasushi Sugaya It is certified that error appears in the above-identified patent and that said Letters Patent is hereby corrected as shown below:

Column 9, Line 22, change "performed at" to --performed at at--.

Column 10, Line 50, change "provided at" to --provided at at--.

Signed and Sealed this

Twentieth Day of April, 2010

David J. Kappos
*Director of the United States Patent and Trademark Office*